Feb. 10, 1931.  W. C. SMITH  1,792,329
SPLIT NUT
Filed Sept. 26, 1928
Fig. 1.
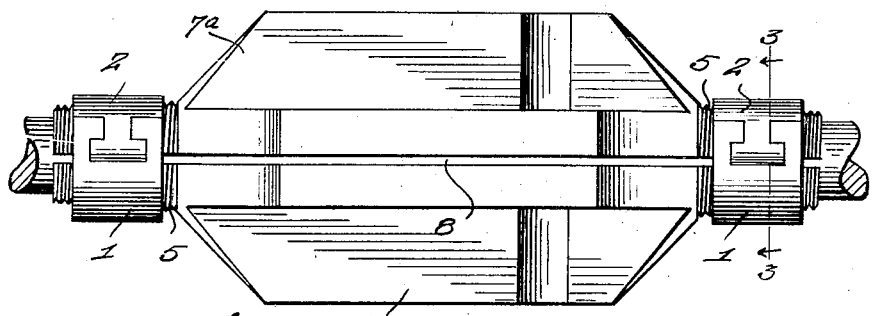
Fig. 2.
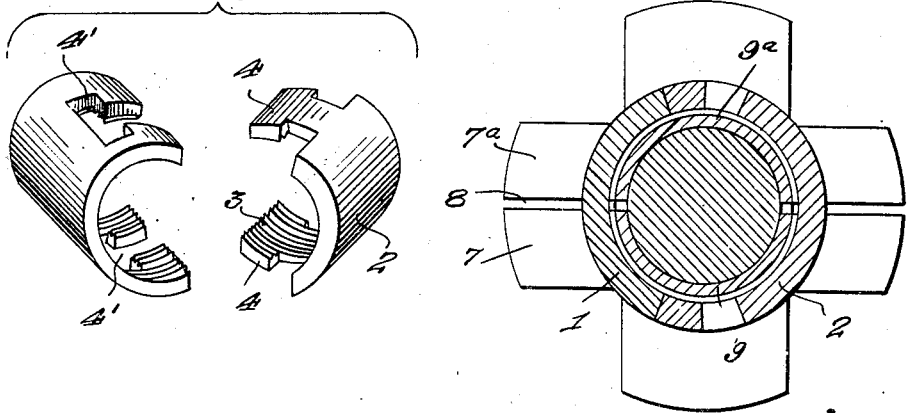
Fig. 3.
Fig. 4.
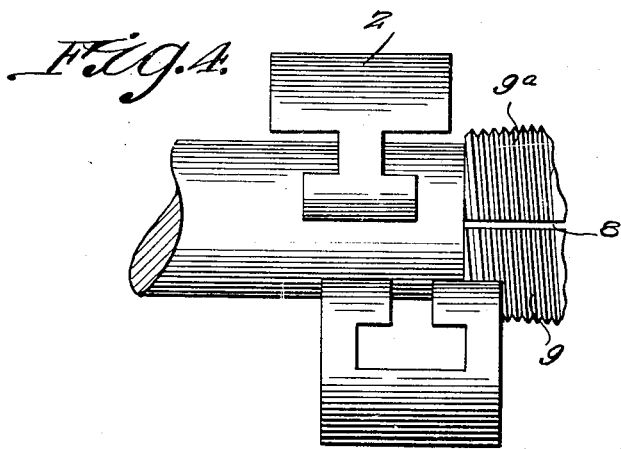
William C. Smith,
INVENTOR
BY Victor J. Evans
ATTORNEY Patented Feb. 10, 1931

1,792,329

UNITED STATES PATENT OFFICE

WILLIAM C. SMITH, OF CORSICANA, TEXAS

SPLIT NUT

Application filed September 26, 1928. Serial No. 308,476.

The present invention relates to a split nut capable of many serviceable applications for coupling shafts, uniting the sections of split pulleys and in general serving as a separable coupling whilst serving the same functions as an ordinary solid nut and when used on machinery of any description will permit dismantling the same with minimum trouble.

In carrying out the invention I provide a pair of annular parts covering different size arcs adapted to unite with a tongue and groove joint preferably of T-shape formed between the parallel sides of the sections. The inner periphery of the sections are provided with a screw thread preferably of tapered character and the parts as described are capable of being assembled to form a coupling for two aligned shafts for split bushings, or for any analogous uses which occur to a skilled engineer.

My invention therefore consists of a sectional nut threaded interiorly and composed of two unequal annular sections fitting together in a tongue and groove joint between its adjacent sides.

It comprises other features of novelty which will be hereinafter more fully described and definitely indicated in the appended claim.

In the drawings illustrating the invention:—

Figure 1 is a side elevation of an application of my invention as a coupling.

Figure 2 is an isometric projection of the two complemental parts of the nut disassembled.

Figure 3 is an enlarged elevational sectional view on the line 3—3 of Figure 1.

Figure 4 shows an application of the invention to a separable bushing or split pulley.

Referring now in detail to the drawings, 1, 2, represent two complemental parts covering different arcs of a circle and adapted when assembled to form a complete annular nut. As shown the section 1 is provided with a mortised cavity 4' of T-shape adapted to accommodate the complemental tongue 4 of T-shape of the part 2 as indicated in Figure 2. Similar tongue and groove complemental parts are provided on each edge of the two sections and the inner periphery of each section is provided with a screw thread 3 preferably of slightly tapered character. Thus when the parts are brought together the portion forming the smaller arc may be interlinked with the associate part 1 while surrounding the shaft to be coupled and then by turning the assembled parts on a split bushing having a male thread the split nut becomes firmly bound in all planes of movement against separation.

In Figure 1 it is shown as applied to a shaft coupling, two split parts 7, 7a, having a longitudinal plane of separation 8 provided with a threaded male extension at each end, and nuts 1, 2, applied thereto and threaded over the male extensions thereby firmly coupling them together. I preferably make the present joint slightly tapered so that when the split nut has gone over the coupling by a Stilson wrench or the like, a firm bond will be provided connecting the shafts.

In Figure 4 the two sectional parts of the nut are shown in proximity ready for assembly over the split bushings 9, 9a, and when brought together to the position shown in Figure 1 they will be united and may be operated as a unit to thread over the male threads as 9a, formed on the sectional bushings. The split nut has a variety of uses; it may be used as a bushing by threading both outside and inside as a reducing bushing. It may be used for fastening collars on shaftings without taking down the shafts, requiring no set screws or keys or the like; it avoids any projections on revolving parts. Its use as a coupling for alined shafts has already been described. It is adapted for use on split pulleys by providing a threaded boss at the hub. Moreover, the parts being annular effects a true alignment and there is no key to divert such. It can also be used as a packing gland for pumps or engines.

It will be noted that the interlocking sections by reason of the T-shaped tongue and joint connection prevents any lateral displacement on either section and the character of the taper joint gives the parts great tensional resistance on power by a wrench or the like. The nut parts may, of course be made of any other material than metal for special uses.

Having thus described my invention what I claim as new and desire to secure by Letters Patent, is:—

A sectional nut comprising large and small sections of different arcs, the larger section being greater than that of a semi-circle to provide a restricted side entrance, the larger section being further provided with T-shaped cavities in communication with the side edges of the body thereof, the smaller section having tongues of substantial T-shape conforming longitudinally thereof to the immediate contour of the assembled nut, and said nut having an interiorly threaded and tapered bore including the inner surfaces of said tongues.

In testimony whereof I affix my signature.

WILLIAM C. SMITH.